UNITED STATES PATENT OFFICE.

TURNER W. WILSON, OF WASHINGTON, DISTRICT OF COLUMBIA, ASSIGNOR TO WILLIAM E. WILSON, OF WASHINGTON, DISTRICT OF COLUMBIA.

FLUX FOR WELDING COPPER.

No. 847,629.  Specification of Letters Patent.  Patented March 19, 1907.

Application filed January 17, 1907. Serial No. 352,786.

*To all whom it may concern:*

Be it known that I, TURNER W. WILSON, a citizen of the United States, residing at Washington, in the District of Columbia, have invented certain new and useful Improvements in Flux for Welding Copper, of which the following is a specification.

This flux consists, essentially, of approximately equal parts of a borate, specifically sodium biborate or borax, and a nitrate, specifically potassium nitrate or saltpeter. The components are preferably finely divided and intimately mixed.

In employing this flux to weld copper the ends of the pieces to be welded are preferably beveled and should be thoroughly freed from scale or oxid. The ends are then heated in a clean fire, preferably one of coke or charcoal, and the mixture of borax and saltpeter is then applied and melted on the surfaces. The portions of the metal to be welded are preferably heated to whiteness and are then welded in the ordinary manner by hammering or compression. A strong and thoroughly satisfactory weld may thus be effected.

I claim—

1. A flux for welding copper, consisting essentially of approximately equal parts of a borate and a nitrate.

2. A flux for welding copper, consisting essentially of approximately equal parts of an alkali-metal borate and an alkali-metal nitrate.

3. A flux for welding copper, consisting essentially of approximately equal parts of sodium biborate and potassium nitrate.

In testimony whereof I affix my signature in presence of two witnesses.

TURNER W. WILSON.

Witnesses:
 WILLIAM E. WILSON,
 WALTER E. HILTON.